United States Patent
Chao et al.

(10) Patent No.: US 10,782,537 B1
(45) Date of Patent: Sep. 22, 2020

(54) DIFFRACTIVE STRUCTURES FOR GENERATION OF INTERFERENCE PATTERNS FOR CLOSE RANGE TRACKING

(71) Applicant: Facebook Technologies, LLC, Menlo Park, CA (US)

(72) Inventors: Qing Chao, Redmond, WA (US); Zhaoming Zhu, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/390,411

(22) Filed: Apr. 22, 2019

(51) Int. Cl.
  *G02B 27/01* (2006.01)
  *G02B 27/42* (2006.01)
  *G02B 27/28* (2006.01)
  *G02B 5/32* (2006.01)

(52) U.S. Cl.
  CPC .......... *G02B 27/4233* (2013.01); *G02B 5/32* (2013.01); *G02B 27/283* (2013.01); *G02B 27/286* (2013.01)

(58) Field of Classification Search
  CPC ............ G02B 27/0172; G02B 27/0176; G02B 27/0101; G02B 27/0093; G02B 2027/0127; G02B 2027/0178; G02B 2027/0138; G02B 2027/014; G02B 2027/0141
  See application file for complete search history.

(56) References Cited

U.S. PATENT DOCUMENTS

2018/0205943 A1* 7/2018 Trail .................... H04N 13/211

OTHER PUBLICATIONS

U.S. Appl. No. 16/016,258, filed Jun. 22, 2018, Inventor Chao et al.
U.S. Appl. No. 15/849,783, filed Dec. 21, 2017, Hall et al.
U.S. Appl. No. 16/028,197, filed Jul. -5, 2-18, Chao et al.

* cited by examiner

Primary Examiner — Joseph P Martinez
(74) Attorney, Agent, or Firm — Fenwick & West LLP

(57) ABSTRACT

A depth camera assembly (DCA) determines depth information within a target area within a threshold distance from the DCA. The DCA includes a source assembly, a diffractive structure, a camera assembly, and a controller. The source assembly includes at least one source within a plane that is bisected by an optical axis of the DCA. The diffractive structure generates an interference pattern that is projected into the target area. The diffractive structure generates the interference pattern using light from the source assembly. The camera assembly captures images of a portion of the target area that includes the interference pattern. The controller determines tracking information for the portion of the target area using the captured images.

22 Claims, 7 Drawing Sheets

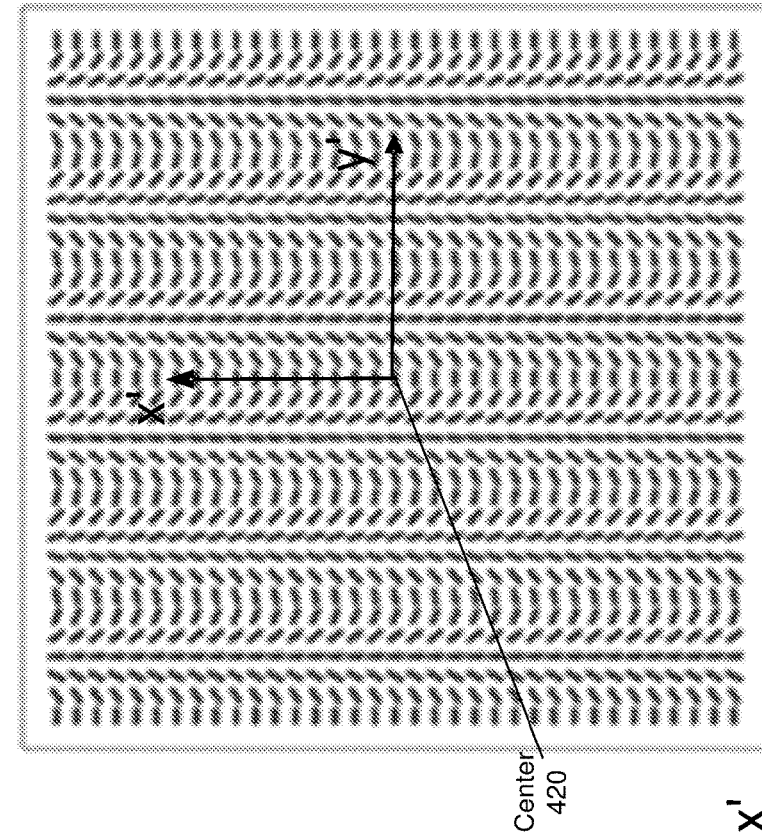
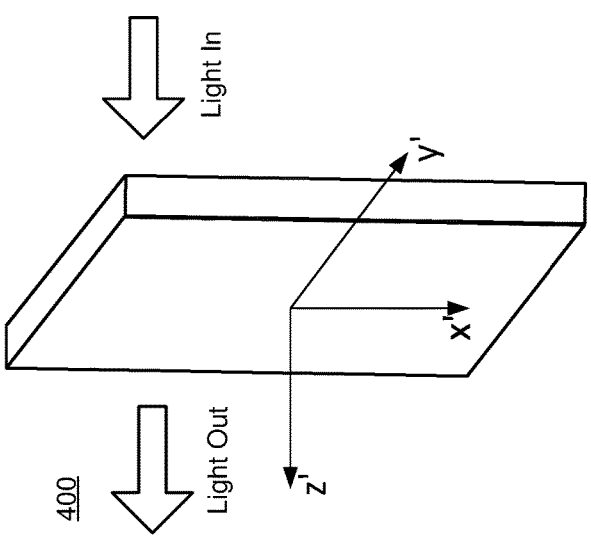
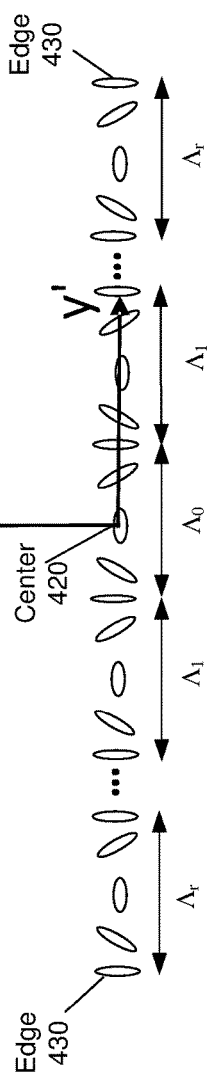
FIG. 4A
FIG. 4B
FIG. 4C

US 10,782,537 B1

DIFFRACTIVE STRUCTURES FOR GENERATION OF INTERFERENCE PATTERNS FOR CLOSE RANGE TRACKING

BACKGROUND

The present disclosure generally relates to tracking systems, and specifically relates to diffractive structures for generation of interference patterns for close range tracking, such as eye and/or facial tracking.

Eye tracking refers to the process of detecting the direction of a user's gaze, which may comprise detecting an orientation of an eye in 3-dimentional (3D) space. Eye tracking in the context of headsets used in, e.g., virtual reality and/or augmented reality applications can be an important feature. Conventional systems for close range tracking and eye tracking commonly use a small number of light sources (e.g., ~8) that emit light which is reflected by the eye, and a camera is used to image the reflection of the light sources from the eye. An orientation of the eye is determined using the captured images. But, the small number of light sources results in a limited model of the eye with a lot of inaccuracies. Moreover, such systems do not track portions of a face surrounding the eye.

SUMMARY

Described herein are various embodiments of diffractive structures that may be used in depth camera assembly's (DCAs) to generate interference patterns for close range tracking. A DCA is used to determine depth information within a target area within a threshold distance from the DCA. In some embodiments, the target area includes an eyebox, and may also include a portion of a face surrounding an eye in the eyebox (e.g., brow, cheek, nose, etc.). The DCA includes the source assembly, a diffractive structure, a camera assembly, and a controller. The source assembly includes one or more sources positioned within a plane that is bisected by an optical axis of the DCA.

The diffractive structure generates an interference pattern that is projected into the target area. The diffractive structure generates the interference pattern using light from the source assembly. In some embodiments, the diffractive structure is a diffractive optical element (DOE). In some embodiments, the diffractive structure is one or more liquid crystal (LC) gratings, a polarization assembly, and a lens assembly. In some embodiments, the diffractive structure is a holographic volume grating and a lens assembly.

In embodiments, where the source assembly includes a plurality of sources, the sources are located at different positions within the plane. And the diffractive structure is configured to generate an interference pattern that is projected into a target area within a threshold distance from the DCA. The diffractive structure generates the interference pattern using light from at least one of the plurality of sources. And a phase of the interference pattern is based in part on positions of one or more sources of the plurality of sources whose light is used to generate the interference pattern;

The camera assembly captures images of a portion of the target area that includes the interference pattern. The controller determines depth information for the portion of the target area using the captured images. Tracking information in the target area may be determined based on the depth information.

In some embodiments, the DCA may be part of a wearable device. The wearable device may also include an electronic display. The electronic display is configured to emit image light, and the image light may be based in part on the depth information determined by the controller.

BRIEF DESCRIPTION OF THE DRAWINGS

FIG. 4A illustrates an example of a Pancharatnam Berry Phase (PBP) LC grating, according to one or more embodiments.

FIG. 4B illustrates an example of liquid crystal orientations in the PBP LC grating of FIG. 4A, according to one or more embodiments.

FIG. 4C illustrates a section of liquid crystal orientations taken along a y' axis in the PBP LC grating of FIG. 4A, according to one or more embodiments.

Figure 1:
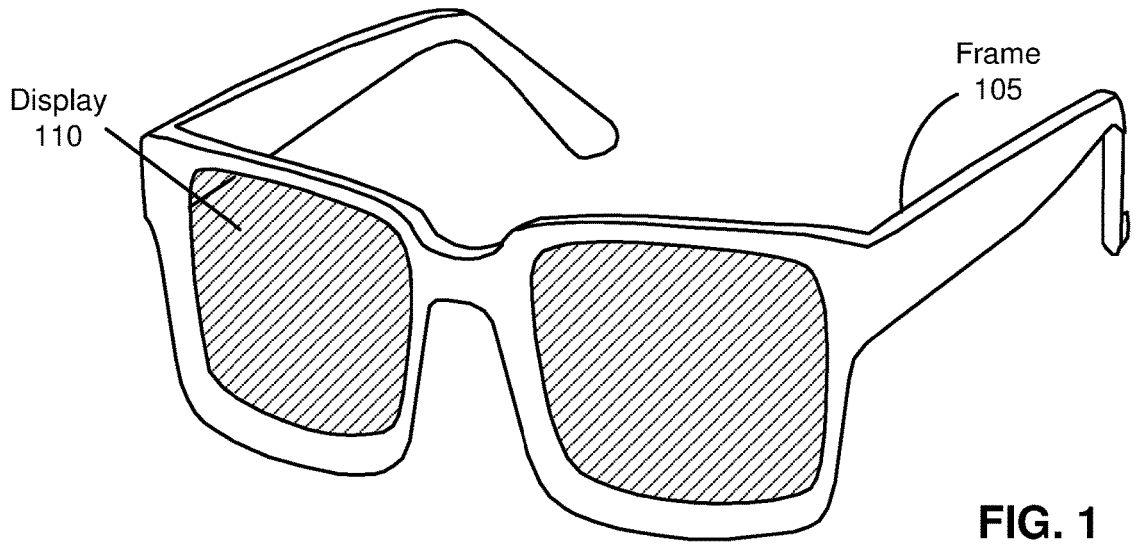
FIG. 1 is a diagram of an eyewear device, according to one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A DCA is used to determine depth information for a target area within a close range. As referred to herein, "close range" is a distance of within 10 meters from the DCA. The DCA may be part of a wearable device, and may be used for determining depth information for at least a portion of the target area. The depth information may be used to determine tracking information in the target area (e.g. eye tracking, facial tracking, hand tracking). A wearable device may be, for example, an eyewear device. The target area includes at least one eyebox, and may include portions of the face surrounding an eye within the eyebox, according to some embodiments. The target area may include a local area of a user, for example, an area of a room the user is in. The DCA includes one or more source assemblies, one or more diffractive structures, one or more camera assemblies, and one or more controllers. The source assembly includes one or more sources positioned within a plane that is bisected by an optical axis of the DCA. The sources emit in the same optical band (e.g., infrared). In some embodiments, the one or more sources include at least one source that emits at a different wavelength than at least one other source and/or at least light from a source is polarized differently than light from at least one other source. The diffractive structure generates an interference pattern using light from the source assembly, and the interference pattern is projected into to the target area.

In some embodiments, the diffractive structure is a diffractive optical element (DOE). The DOE diffracts an input light beam into a pair of first order diffracted output light beams and has a DOE phase profile, according to some embodiments. Respective light in the target area from the one or more sources, that has been transmitted by the DOE, may be a Fourier transform of a spatial profile of the light multiplied by the DOE phase profile. Light from any source of the one or more sources that is transmitted by the DOE is a Fourier transform of a spatial profile of the light multiplied by the DOE phase profile. In embodiments, where there are multiple sources (e.g., three), the DOE produces an interference pattern that has a phase offset based in part on locations of sources used to generate the interference pattern.

In some embodiments, the diffractive structure includes a liquid crystal (LC) grating, a polarization assembly, and a lens assembly. The liquid crystal grating is configured to receive light from the source assembly, and for each respective source of the source assembly generates at least a first right hand circularly polarized (RCP) beam and a left hand circularly polarized (LCP) beam that are diverging from each other. The polarization assembly is configured to convert the RCP beam and the LCP beam to a first linear polarized beam and second linear polarized beam, respectively. The lens assembly (e.g., array of microlenses) is configured to direct the first polarized beam and the second polarized beam such that they overlap and interfere to form the interference pattern which is projected into the target area. In embodiments, where there are multiple sources (e.g., three), the diffractive structure produces an interference pattern that has a phase offset based in part on locations of sources used to generate the interference pattern.

In some embodiments, the diffractive structure includes a LC grating stack. The LC grating stack includes a plurality of LC gratings and each LC grating in the LC grating stack is offset from adjacent LC gratings. Light from the source assembly passes in series through a common portion of the plurality of LC gratings to form a first right circularly polarized (RCP) and a left hand circular polarized (LCP) beam that are diverging from each other. The lens assembly (e.g., array of microlenses) is configured to direct the first polarized beam and the second polarized beam such that they overlap and interfere to form the interference pattern which is projected into the target area. In embodiments, where there are multiple sources (e.g., three), the diffractive structure produces an interference pattern that has a phase offset based in part on locations of sources used to generate the interference pattern. In some embodiments, each of the multiple sources emits light of different wavelengths, and the diffractive structure produces an interference pattern that has a phase offset based in part on the wavelength of light used to produce the interference pattern.

In some embodiments, the diffractive structure includes a volume holographic grating and a lens assembly. The volume holographic grating is configured to receive light from the source assembly, and for each respective source of the source assembly the volume holographic grating generates a respective first diffracted beam and a respective second diffracted beam that are diverging from each other. The lens assembly (e.g., array of microlenses) is configured to direct the first diffracted beam and the second diffracted beam such that they overlap and interfere to form the interference pattern in the target area. In embodiments, where there are multiple sources (e.g., three), the diffractive structure produces an interference pattern that has a phase offset based in part on locations of sources used to generate the interference pattern.

Various embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) and/or a near-eye display (NED) connected to a host computer system, a standalone HMD and/or NED, a mobile device or computing system, or any other hardware platform capable of providing artificial reality content to one or more viewers.

FIG. 1 is a diagram of a headset 100, according to one or more embodiments. As illustrated the headset 100 is a near-eye display (NED). In alternate embodiments, the headset 100 may be a head-mounted display (HMD). The headset 100 presents media to a user. Examples of media presented by the headset 100 include one or more images, video, audio, or some combination thereof. In some embodiments, audio is presented via an external device (e.g., speakers and/or headphones) that receives audio information from the headset 100, a console (not shown), or both, and presents audio data based on the audio information. The headset 100 is generally configured to operate as an artificial reality headset.

The headset 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the headset 100. The display 110 includes at least one display assembly (not shown) for directing one or more image light to an eye of the user.

The headset 100 additionally includes one or more depth camera assemblies (not shown), as described in further detail with reference to FIG. 2. The one or more depth camera assemblies (DCAs) determine depth information for corresponding target areas. As described herein, the one or more DCAs determine depth information about a user's eyes and/or face.

Figure 2:
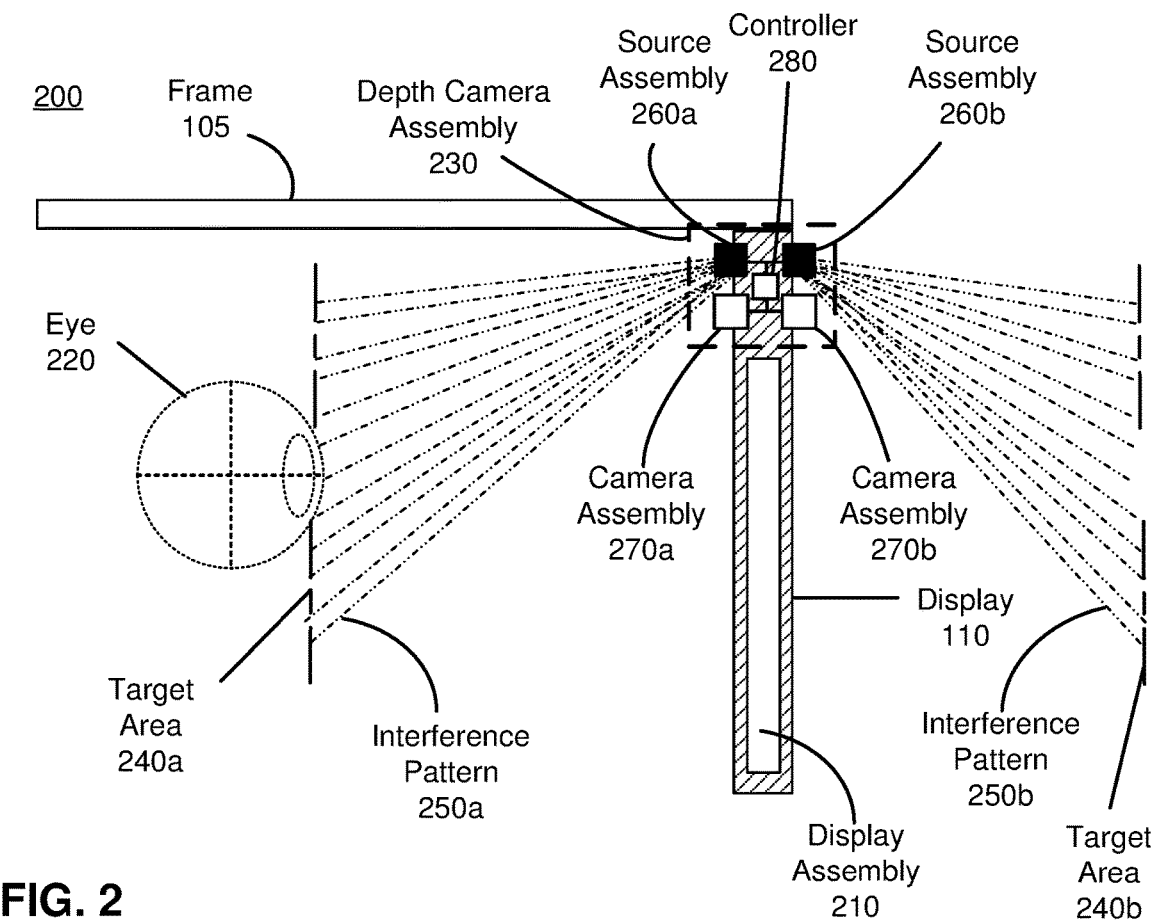
FIG. 2 is a cross-section of the headset illustrated in FIG. 1, according to one or more embodiments.

FIG. 2 is a cross-section 200 of the headset 100 illustrated in FIG. 1, according to one or more embodiments. The display 110 includes at least one display assembly 210. An eye box is a location where an eye 220 is positioned when the user wears the headset 100. A target area 240a includes an eye box. As illustrated in FIG. 2, a second target area 240b includes a local area of a user of the headset 100 in an outward direction away from the eye 220. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to an eye box of another eye of the user.

The display assembly 210, as illustrated below in FIG. 2, is configured to direct the image light to the eye box of the eye 220. The display assembly 210 may be composed of one or more materials (e.g., plastic, glass, etc.) with one or more refractive indices that effectively minimize the weight and widen a field of view (hereinafter abbreviated as 'FOV') of the headset 100.

In some configurations, the headset 100 includes one or more optical elements between the display assembly 210 and the eye 220. The optical elements may act to, e.g., correct aberrations in image light emitted from the display assembly 210, magnify image light emitted from the display assembly 210, apply some other optical adjustment of image light emitted from the display assembly 210, or some combination thereof. The example for optical elements may include an aperture, a Fresnel lens, a convex lens, a concave lens, a filter, or any other suitable optical element that affects image light.

The headset 100 includes at least one DCA 230 for determining depth information of an object in a target area. The example illustrated in FIG. 2 shows the DCA 230 including a source assembly 260a and a camera assembly 270a facing inwards towards the eye 220, in addition to a source assembly 260b and a camera assembly 270b facing outwards away from the eye 220. In other embodiments the DCA 230 features a single source assembly and a single camera assembly facing either inwards or outwards. The headset may include additional DCAs. The target area 240a includes at least an eyebox, and in some embodiments, may include portions of a face surrounding the eye 220. The portion of the face surrounding the eye 220 may include, e.g., a portion of cheek, a portion of a brow, a portion of a nose, or some combination thereof. The target area 240b includes at least a portion of a local area (e.g., in front of) of the headset 100. The local area of the headset 100 may include, for example objects in a room and/or objects such as a face of a person the user is looking at. The DCA 230 includes source assemblies 260a, 260b, camera assemblies 270a, 270b, and a controller 280. In other embodiments, the DCA 230 includes an additional controller, such that the controller 280 controls the source assembly 260a and the camera assembly 270a, while the additional controller controls the source assembly 260b and the camera assembly 270b, or vice-versa. The DCA 230 illuminates each target area 240a, 240b with a corresponding interference pattern 250a, 250b. The interference pattern 250a may have a same pattern as the same as the interference pattern 250b. The camera assembly 270a captures an image of the target area 240a, and the controller 280 determines depth information for surfaces within the target area 240a. The camera assembly 270b captures an image of the target area 240b, and the controller 280 determines depth information for surfaces within the target area 240b. In some embodiments, at least one of the source assemblies 260a, 260b may output structured light into multiple target areas. For example, the source assembly 260a may illuminate multiple eye boxes (i.e., one for each eye) with an interference pattern.

Each of the source assemblies 260a, 260b generates one or more interferences patterns. As described in detail below with regard to FIGS. 3A-6, each source assembly includes one or more sources and a diffractive structure. The one or more sources generate coherent light. A source may be, e.g., a vertical cavity surface emitting laser (VCSEL), an edge emitting laser, a tunable laser, some other source that emits coherent light, or some combination thereof. The one or more sources are configured to emit within an infrared (IR) band (e.g., 780 nm to 2500 nm). The source assembly 260 may be located anywhere on the headset 100. For example, the source assemblies 260a, 260b may be located on one portion of the frame 105, and the depth cameras 270a, 270b may be located on a separate portion of the frame 105. In some embodiments, the source assembly 260a forms a baseline with the depth camera 270a that is used for triangulation calculations and determining a depth of an object. Similarly, the source assembly 260b may form a baseline with the depth camera 270b that is used for triangulation calculations and determining a depth of an object In some embodiments, the one or more sources includes a plurality of sources. As discussed in detail below with regard to FIGS. 3A, 5A, and 6A, the plurality of sources have a positional offset from each other. The positional offset causes relative phase differences between interference patterns produced using different sources. The plurality of sources may include, e.g., sources that emit at substantially different wavelengths (e.g., different sub-bands) of the IR band from one other, one or more sources that can emit in multiple different sub-bands (e.g., a source that can switch between emitting light in different sub-bands), sources that emit light having different polarizations from one other, one or more sources that can emit light of different polarizations, or some combination thereof. For example, the plurality of sources may include at least a first source that emits light or is polarized with a polarizing element such that the emitted light has a first polarization (e.g., p-polarized or left hand circularly polarized) and a second source that emits light that emits light or is polarized with a polarizing element such that the emitted light has a second polarization (e.g., s-polarized or right hand circularly polarized) that is orthogonal to the first polarization.

In some embodiments, one or more of the plurality of sources are dynamically assigned to groups that can have two potential states (i.e., an active state or an inactive state) in accordance with instructions from the controller 280. A group may include one or more sources. In some embodiments, a source may be in multiple groups. An active state is a state where all of one or more sources in the group emit light. An inactive state is a state where none of the one or more sources in the group emit light.

In some embodiments, the plurality of sources is configured to emit light at a same wavelength, and for a given time period only one group is in an active state, and any remaining groups are in an inactive state. For example, the plurality of sources may include a first group that include a first source and a second group that includes a second source. At a first time period the first group is in an active state (and emits light at a first wavelength) and the second group is in an inactive state, and in a subsequent second time period the first group is in an inactive state and the second group is in an active state (and emits light at the first wavelength). As discussed below, in some embodiments, a positional offset between the first source and the second source causes a relative phase offset between an interference pattern produced by the diffraction structure in the first time period and an interference pattern produced in the second time period.

In some embodiments, multiple groups that emit light in different optical bands and/or at different polarizations are active over a same time period. For example, for a given time period a first group and a second group are in an active state, and any remaining groups are in an inactive state, and sources in the first group emit light in a different optical band than light emitted by sources in the second group. For example, the first group may include a first source that emits light in a first sub-band and the second group may include a second source that emits light in a second sub-band that is different than the first sub-band. In this embodiment, the first sub-band and the second sub-band are separated enough from each other in wavelength such that they do not interfere with each other as they propagate through the diffraction structure. In another example, for a given time period a first group and a second group are in an active state, and any remaining groups are in an inactive state, and sources in the first group emit light that has a different polarization than light emitted from sources in the second group.

The diffractive structure of each source assembly generates the corresponding interference pattern 250a, 250b using light from at least one of the one or more sources of the source assembly 260. As discussed in detail below, the diffractive structure may be, e.g., a DOE; a LC grating or a LC grating stack, a polarization assembly, and a lens assembly; or a volume holographic grating, and a lens assembly. The diffractive structure is configured to generate one or more interference patterns. In some embodiments, each interference pattern is generated using light from a different group of one or more sources. For example, light from a first group causes the diffractive structure to produce a first interference pattern, and light from a second group causes the diffractive structure to generate a second interference pattern that has a phase offset relative to the first group. The phase offset may be due to, e.g., offsets in positioning of the one or more sources. In some embodiments the diffractive structure includes a plurality of LC gratings where offsets between a plurality of LC gratings result in phase offsets in the different interference patterns.

The camera assembly 270a captures images of the target area 240a. Similarly, the camera assembly 270b captures images of the target area 240b. Each of the camera assemblies 270a, 270b includes one or more imaging devices which capture images of the corresponding target area 240a, 240b illuminated with the corresponding interference pattern 250a, 250b. In some embodiments, the one or more imaging devices of the camera assembly 270a capture images of the eye 220 and portions of the face surrounding the eye 220. In some embodiments, the one or more imaging devices of the camera assembly 270b captures images of the target area 240b including objects in a local area of the headset 100. An imaging device may be, e.g., a detector array, camera or video camera, some other device configured to capture light emitted by one or more source assemblies, capture light in a visible band (e.g., ~380 nm-700 nm), or some combination thereof. In some embodiments, imaging devices may include optical filters to filter for light of the same optical band/sub-band and/or polarization of one or more interference patterns that are being projected onto one of the target areas 240a, 240b.

The controller 280 controls the source assembly 260a, the source assembly 260b, the camera assembly 270a, and the camera assembly 270b. The controller 280 instructs the source assemblies 260a, 260b to each generate one or more interference patterns over various time periods. For example, the controller 280 may instruct the source assembly 260a to sequentially illuminate the target area 240a with a series of interference patterns (that have phase offsets relative to each other) that are presented individually over respective periods of time. The controller 280 may instruct the source assembly 260b to do the same with respect to the target area 240b. In some embodiments, the controller 280 may instruct the source assembly 260a to illuminate the target area 240a with a plurality of interference patterns of different wavelength and/or polarization over a same time period. The controller 280 may instruct the source assembly 260b to do the same with respect to the target area 240b.

The controller 280 instructs the camera assemblies 270a, 270b to capture images of the respective target areas 240a, 240b illuminated with a structured light pattern. Note in some embodiments, the controller 280 may instruct the camera assemblies 270a, 270b to capture images (e.g., in IR band and/or visible band) of the respective target areas 240a, 240b when they are not illuminated with an interference pattern.

The controller 280 determines depth information using the captured images from the camera assemblies 270a, 270b. The controller 280 determines depth information by, e.g., measuring distortion (e.g., via triangulation) of the respective interference patterns 250a, 250b over the respective target areas 240a, 240b. The controller 280 can determine depth information using images of the respective target area 240a, 240b being illuminated by individual interference patterns with different phase offsets than the respective interference pattern 250a, 250b. The different phase offset positions the interference pattern over a different region within the respective target area 240a, 240b. The controller 280 determines depth information for the respective target area 240a, 240b using all of these images, thereby providing increased resolution to the depth information. Note in embodiments where there are multiple interference patterns in a single image (e.g., at different wavelengths and/or polarizations), the controller 280 is able to generate depth resolution faster. In these embodiments, a single image provides the information for a particular level of depth information resolution, whereas multiple images are used to provide the same level of depth information resolution in the embodiment where a single interference pattern is in each image.

The controller 280 determines depth information for objects in each of the target areas 240a, 240b. In the case where a target area includes the eye box, the controller 280 determines tracking information for the eye 220 and/or portions of the face surrounding the eye 220 using the depth information. In some embodiments, tracking information describes a position of the eye 220 and/or the portions of the face surrounding the eye 220. The controller 280 can estimate a position of the eye 220 using the one or more captured images to determine tracking information. In some embodiments, the controller 280 may also estimate positions of portions of the face surrounding the eye 220 using the one or more captured images to determine tracking information. There are many methods known to one skilled in the art to determine tracking information (eye and/or face) from depth information that may be used. One method that may be used for determining eye-tracking information is based on mapping portions of the one or more captured images to a 3D portion of an iris of the eye 220 to find a normal vector of the eye 220. By doing this for both eyes, the gaze direction of the user may be estimated in real time based on the one or more captured images. Additional details of methods that may be used for determining tracking information based on the one or more captured images may be found at, e.g., U.S. application Ser. Nos. 16/016,258, 15/849,783, which are incorporated herein, in their entirety. The controller 280 may then update a model of the eye 220 and/or the portions of the face surrounding the eye 220.

Figure 3A:
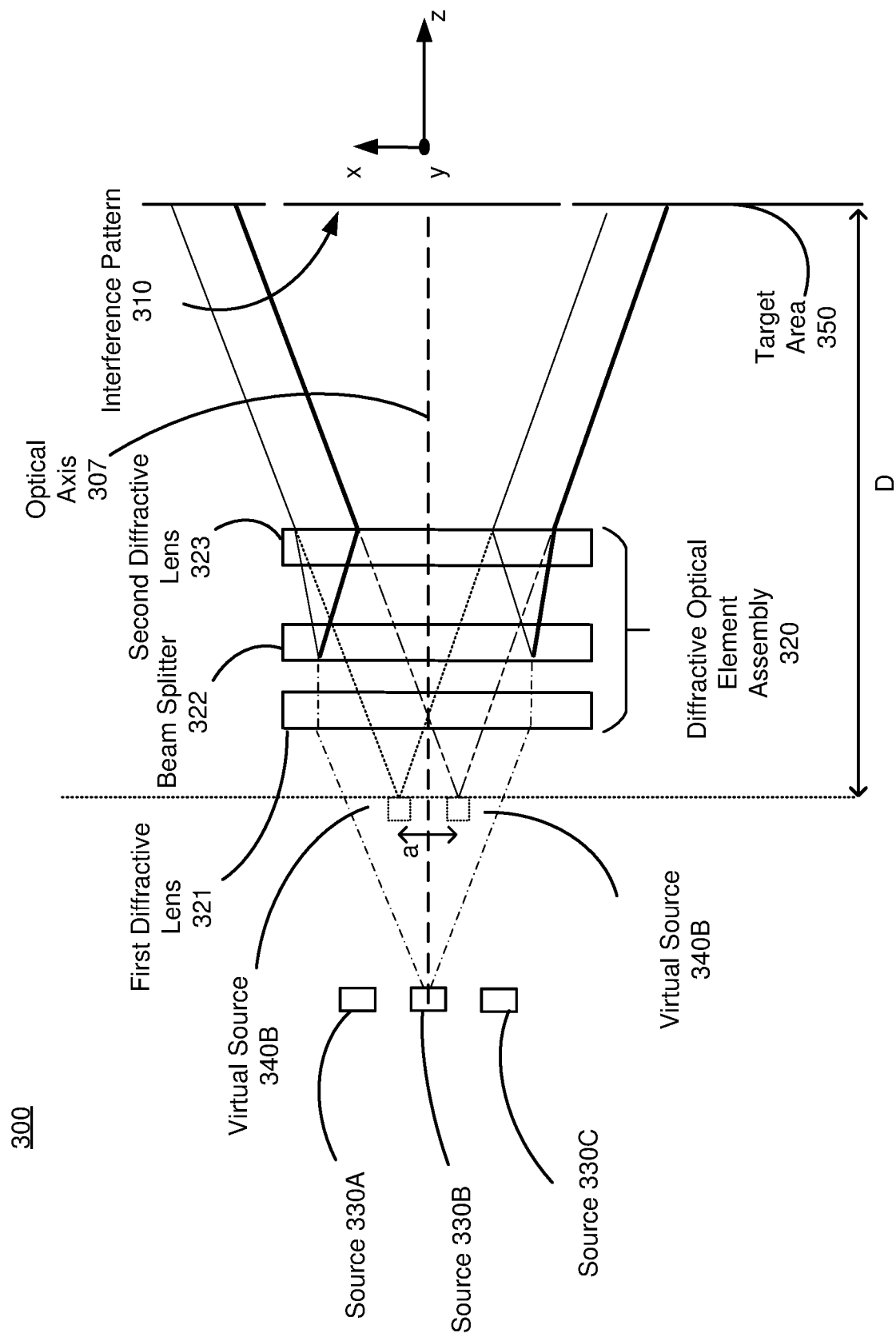
FIG. 3A is an example of a source assembly generating an interference pattern using a diffractive optical element, according to one or more embodiments.

FIG. 3A is an example of a source assembly 300 generating an interference pattern 310 using a DOE assembly 320, according to one or more embodiments. The source assembly 300 is an embodiment of the source assembly 260. The source assembly 300 includes a plurality of sources (i.e., source 330A, source 330B, source 330C), and the DOE assembly 320. The source assembly 300 also includes virtual source (e.g., 340B), each associated with one of the sources 330A, 330B, and 330C and the DOE assembly 320. A virtual source is not a physical light source, but instead is a location in space where light received at the target area 350 appears to originate from. For example, light received at the target area 350 seems to originate from the virtual sources 340B. The use of the virtual sources 340B facilitates the understanding and calculation of the interference pattern 310. The target area 350 may be an embodiment of one of: the target area 240a and the target area 240b.

Examples of virtual sources 340B are illustrated in FIG. 3A, each of the virtual sources 340B associated with the source 330B. While FIG. 3A only illustrates the virtual sources 340B, the source assembly 300 also includes virtual sources (not shown) associated with the source 330A and the source 330C. In alternate embodiments (not shown), the source assembly 300 includes some other number of sources and/or other components. For example, the source assembly 300 may also include a lens system configured to help project the interference pattern 310 into a target area. And in some embodiments, there may be one or more lenses between one or more of the source 330A, the source 330B, and the source 330C that condition (e.g., collimate, expand, etc.) the light prior to it being incident on the DOE assembly 320.

Note that while a separation in z is shown between each of the components of the source assembly 300 in FIG. 3A, in other embodiments, the distances between components may be different and/or negligible. For example, in some embodiments, the sources are coupled directly to the DOE assembly 320.

The plurality of sources is arranged such that light from each source may be used to generate a different interference pattern 310 (e.g., has a phase offset such that it is different from the other interference patterns 310). FIG. 3A illustrates an example of light paths associated with the source 330B. The light paths associated with the source 330A and 330C are not shown in FIG. 3A, for clarity. Each of the plurality of sources have a positional offset from one another, such that each of the plurality of sources is located over a different respective range of x-y values and potentially z values. In the illustrated embodiment, the plurality of sources is arranged in a plane substantially parallel to the DOE assembly 320. In some embodiments, the plurality of sources is arranged such that a point of emission (i.e., location from which a source emits light) for each of the plurality of sources is on a line that is perpendicular to the z-axis. In the illustrated embodiment, the line is parallel to the x-axis and perpendicular to an optical axis 307 of the source assembly 300, but more generally it can be at any angle relative to the x-axis and/or the optical axis 307. Moreover, in some embodiments, a point of emission for at least one source has a substantially different z value than a point of emission for another source.

In the illustrated example, the plurality of sources is arranged such that there is a 120 degree phase offset between interference patterns 310 produced using adjacent sources.

For example, there is a 120 degree phase offset between the interference pattern 310 produced using the source 330A and an interference pattern 310 produced using the source 330B, and a 240 degree phase offset between the interference pattern 310 and an interference pattern 310 produced using the source 330C. In some embodiment, an offset from a point of emission (i.e., location from which a source emits light) between two adjacent sources is designed to achieve particular coverage of the target area 350 with various interference patterns 310. Note that in other embodiments, where there are more sources that emit light in substantially the same wavelength, the offsets may be such that there is some other degree phase offset between the interference patterns 310. For example, five sources may be positioned such that there is a 72 degree offset in phase between interference patterns 310 of adjacent sources.

The DOE assembly 320 is a diffractive structure that generates an interference pattern 310 using light from one or more of the plurality of sources. The function of the DOE assembly 320 includes proper beam shaping and splitting an incident beam into two roughly equal beams. In one embodiment, the DOE assembly 320 includes a first diffractive lens 321 for collimating the divergent light from a source (e.g., source 330B), followed by a beam splitter 322 for splitting the collimated beam into two beams (e.g., +1 and −1 diffraction orders). In some embodiments, the beam splitter is a diffractive-type beam splitter. A diffractive-type beam splitter is advantageous for its small and flat size, improving the compactness of the DOE assembly 320. The collimation of the incident beam reduces the beam divergence so the beam splitter 322 has better performance (constant splitting ratio, high efficiency, and minimal beams at un-used orders). The two beams interfere to generate an interference pattern (e.g., the interference pattern 310) in the respective target area. Depending on the target area requirement, a second diffractive lens 323 may follow the DOE assembly 320 to bring the two beams together to cover the area. The second diffractive lens 323, in some embodiment, can be in the form of a diffractive lens and may be a part of the DOE assembly 320 following the diffractive lens stack and the beam splitting stack.

In some embodiments, the DOE assembly 320 may include a DOE that may be a phase type DOE with either a continuous surface relief profile (also known as kinoform), a binary-level surface relief profile, or multi-level surface relief profile. For example, a binary-level surface relief profile may suffer from a lower diffraction efficiency, but has advantages with respect to fabrications, such as a less complex and more stable fabrication process and improved yield. The DOE assembly 320 may include a DOE with a diffractive surface on one side of the DOE or on both sides of the DOE (double-sided DOE). A DOE with a diffractive surface on one side of the DOE may be, for example, a lens with a diffraction grating on one side of the lens. A double-sided DOE may be, for example a lens with a diffraction grating on both sides of the lens. In some embodiments, the DOE assembly 320 includes a DOE performing multiple functions (such as collimation and beam splitting) by using a double-sided DOE in which one surface has a collimation function while the other surface has a beam splitting function. In this case, the double-sided DOE may be used instead of the first diffractive lens 321 and the beam splitter 322. In some cases, a single surface may be designed to have both functions in order to meet certain form-factor requirement.

The DOE assembly 320 together with the second diffractive lens 323 is designed such that for a given distance there are a predetermined number of fringes in the interference pattern 310 projected on the target area 350, according to some embodiments. The beam splitting angle (which determines the periodicity of surface relief profile) and the lenses are co-designed to form two virtual sources (or double pinholes or slits), e.g., virtual sources 340B corresponding to source 330B from which two the divergent beams interfere at the target area 350. If an angular fringe period θ of the interference pattern, with respect to the virtual sources, is small, a relation between the angular fringe period θ and the fringe period p is:

$$\theta = p/D \quad (1)$$

The relation between the fringe period (p) observed at a distance D and the distance between the virtual sources (a) is:

$$p = (\lambda/a)D, \quad (2)$$

where λ is wavelength of the source and D is the distance between virtual sources 340B to the target area 350. Note that D is different from the distance between a real source, e.g. source 330A, source 330B, source 330C, and the target area 350 or the distance between the DOE assembly 320 and the target area 350, because lenses (for beam shaping or divergence control) are used between the real source and the target area. To generate another interference pattern 310 that has a 120-degee phase shift relative to the interference pattern 310 associated with the source 330B, the source 330A is placed such that its two virtual sources are shifted from those due to the source 330B by a lateral shift b1:

$$b1 = (m \pm 1/3)a, \quad (3)$$

where m is an integer. b1 is designed to be a value that meets various constraints such as source size and package limitation. Similarly, the source 330C can be placed to generate an interference pattern 310 with −120 degrees (or 240 degrees) phase shift relative to the interference pattern 310 associated with the source 330B. In the same way, other phase shift (Δφ) can be achieved by properly place a source whose two virtual sources are laterally displaced by a distance b2:

$$b2 = (m \pm \Delta\varphi/360)a, \quad (4)$$

where m is an integer. In some embodiments, the lateral displacement of virtual sources is not exactly the same as the lateral displacement between the corresponding real sources due to, for example, lenses of the DOE assembly 320.

Figure 3B:
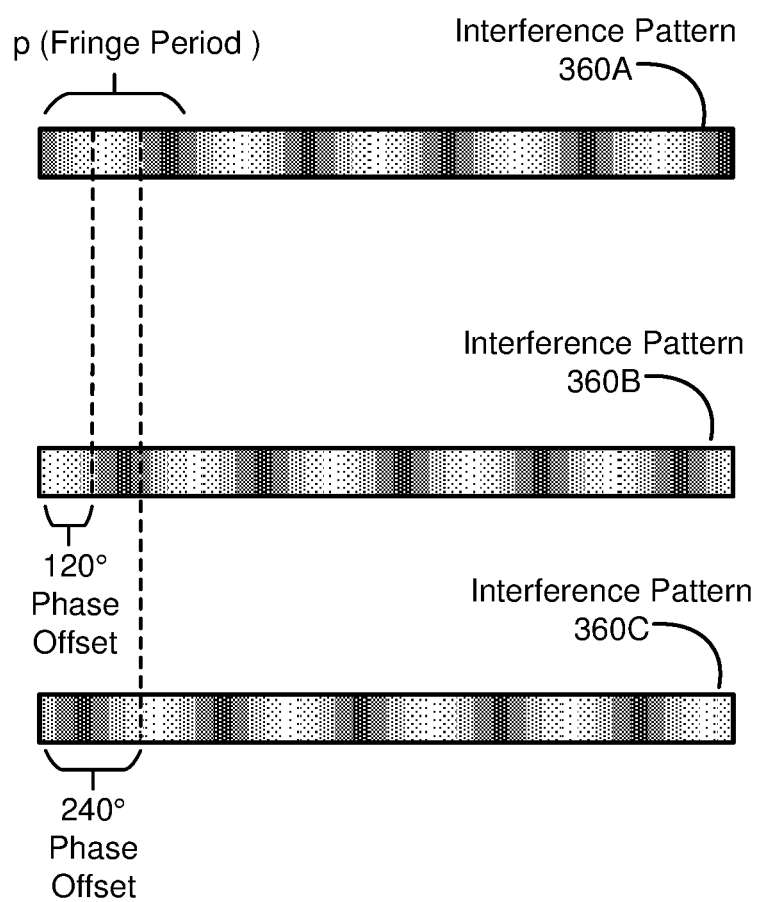
FIG. 3B illustrates phase offsets between portions of example interference patterns produced by the source assembly of FIG. 3A, according to one or more embodiments.

FIG. 3B illustrates phase offsets between portions of example interference patterns produced by the source assembly of 3A, according to one or more embodiments. Light from the source 330A is used to produce an interference pattern 360A, light from the source 330B is used to produce an interference pattern 360B, and light from the source 330C is used to produce an interference pattern 360C. The interference patterns 360A, 360B, 360C are a same pattern that are offset in phase relative to one other. As noted above, the phase offset is due to the positional offset of the sources 330A, 330B, 330C from one another. Continuing with the example discussed above with regard to FIG. 3A, there are 3 sources that are arranged such that there is a 120 degrees phase offset between interference patterns produced by adjacent sources. For example, the interference pattern 360B has a phase offset of 120 degrees relative to the interference pattern 360A, and the interference pattern 360C has a phase offset of 120 degrees relative to the interference pattern 360B.

The controller can instruct the source assembly 300 to cycle through the various sources such that bars (areas of high light amplitude) associated with each interference pattern illuminate different portions of the target area 350, thereby providing more accurate depth information than, e.g., a single static interference pattern.

Note that in some embodiments (not shown) the source assembly 300 includes at least one source that emits at a wavelength that is substantially different than at least one other source (i.e., emit in different optical sub-bands) and/or light from at least one source has a substantially different polarization than light from at least one other source. In these embodiments, two sources of orthogonal polarizations (which do not interfere with each other) and/or two sources of different optical sub bands may be active at the same time, allowing for a plurality of different interferences patterns to appear in the target area 350 during the same time period that cover different areas (there can be some overlap) of the target area 350. The different interference patterns cover more area within the target area 350, and thereby allow for potentially faster determination of depth information.

The source assembly 300 can be produced in a manner that is very compact and efficient. According to some embodiments, the DOE assembly 320 is a passive optical element and does not consume electrical power when operated. Compared to a source assembly using an acousto-optic modulator, the source assembly 300 including the passive DOE assembly 320 has an improved power efficiency. Additionally, in some embodiments, the DOE assembly 320 may fit into a space of a few millimeters by a few millimeters, allowing the source assembly to maintain a relatively small size. For example, the DOE assembly 320 may include a surface-relief grating with small size and high diffraction efficiency. In other embodiments a photonic integrated circuit (IC) waveguide may be used to generate interferometric fringes. For embodiments of the DOE assembly 320 using a photonics IC waveguide, power consumption may be higher than a passive DOE assembly in order to, for example, achieve phase shifting using a thermo-controller and/or an electro-controller. More details regarding the photonic IC waveguide may be found at, for example, U.S. application Ser. No. 16/028,197, which is incorporated herein, in its entirety. In some embodiments, the DOE assembly 320 includes a surface-relief grating which may have a benefit of a small size and high diffraction efficiency. For example, the DOE assembly 320 may have a diffraction efficiency above 90%.

FIG. 4A illustrates an example of a Pancharatnam Berry Phase (PBP) LC grating 400, according to one or more embodiments. The PBP liquid crystal grating 400 creates a respective grating profile via an in-plane orientation (θ, azimuth angle) of a liquid crystal molecule, in which the phase difference T=2θ.

FIG. 4B illustrates an example of liquid crystal orientations 410 in the PBP liquid crystal grating 400 of FIG. 4A, according to one or more embodiments. In the PBP liquid crystal grating 400, an azimuth angle (θ) of a liquid crystal molecule is continuously changed along a particular axis (e.g., the y-axis), with a fixed pitch Δ. For example, as illustrated in FIG. 4B, the azimuth angle θ of the liquid crystal molecules in the PBP LC grating 400 varies along the y-axis (while being constant along the x-axis), characterized by the equation $$\theta(y) = \frac{\pi y}{\Lambda} = \pi \cdot y \cdot \sin\theta/\lambda_0,$$

where θ corresponds to the diffraction angle of the PBP LC grating 400, which is based upon the fixed pitch Λ of the PBP LC grating 400 (e.g., $\theta=\sin^{-1}(\lambda_0/\Lambda)$).

FIG. 4C illustrates a section of liquid crystal orientations 440 taken along a y' axis in the PBP liquid crystal grating 400 of FIG. 4A, according to one or more embodiments. It is apparent from the liquid crystal orientation 440 that a rate of pitch variation is fixed and it is not a function of distance from center of grating 420. For example, a pitch at the center of grating 420 ($\Lambda_0$), is the same as a pitch at the edges of the grating ($\Lambda r$), i.e., $\Lambda_0=\Lambda_1=\ldots=\Lambda r$.

In some embodiments, PBP liquid crystal gratings may be active (also referred to as an active element) or passive (also referred to as a passive element). An active PBP liquid crystal grating has two optical states (i.e., diffractive and neutral). The diffractive state causes the active PBP liquid crystal grating to diffract light into a first beam and a second beam that each have different polarizations. The diffractive state includes an additive state and a subtractive state. In an additive state, the additive state causes the active PBP liquid crystal grating to diffract light at a particular wavelength to a positive angle (+θ). The subtractive state causes the active PBP liquid crystal grating to diffract light at the particular wavelength to a negative angle (−θ). The neutral state does not cause any diffraction of light (and does not affect the polarization of light passing through the active PBP liquid crystal grating). The state of an active PBP liquid crystal grating is determined by a handedness of polarization of light incident on the active PBP liquid crystal grating and an applied voltage. An active PBP liquid crystal grating operates in a subtractive state responsive to incident light with a right handed circular polarization and an applied voltage of zero (or more generally below some minimal value), operates in an additive state responsive to incident light with a left handed circular polarization and the applied voltage of zero (or more generally below some minimal value), and operates in a neutral state (regardless of polarization) responsive to an applied voltage larger than a threshold voltage which aligns liquid crystal with positive dielectric anisotropy along with the electric field direction. If the active PBP liquid crystal grating is in the additive or subtractive state, light output from the active PBP liquid crystal grating has a handedness opposite that of the light input into the active PBP liquid crystal grating. In contrast, if the active PBP liquid crystal grating is in the neutral state, light output from the active PBP liquid crystal grating has the same handedness as the light input into the active PBP liquid crystal grating.

In some embodiments, the PBP liquid crystal grating is a passive element. A passive PBP liquid crystal grating has an additive optical state and a subtractive optical state, but does not have a neutral optical state. As an incident beam passes through the passive PBP liquid crystal grating, any left circularly polarized part of the beam becomes right circularly polarized and diffracts in one direction (+1$^{st}$ diffraction order), while any right circularly polarized part becomes left circularly polarized and diffracts in the other direction (−1$^{st}$ diffraction order).

Figure 5A:
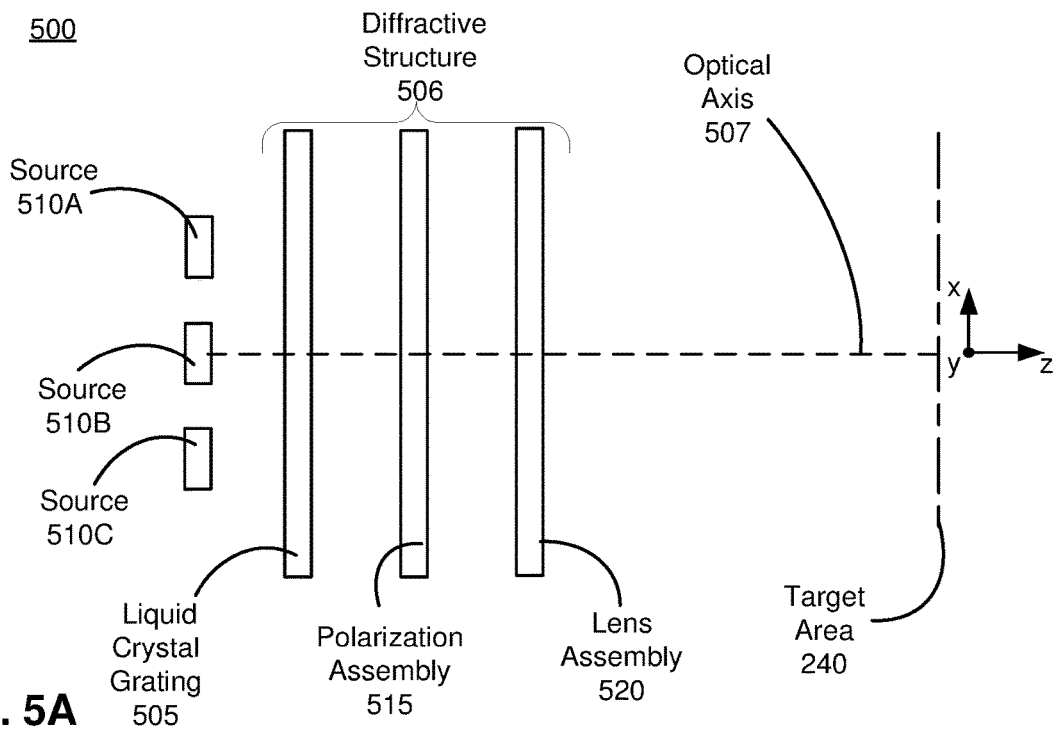
FIG. 5A is an example of source assembly that includes a liquid crystal grating, according to one or more embodiments.

FIG. 5A is an example of source assembly 500 that includes a liquid crystal (LC) grating 505, according to one or more embodiments. The source assembly 500 is an embodiment of the source assembly 260. The source assembly 500 includes a plurality of sources (e.g., source 510A, source 510B, source 510C) and a diffractive structure 506. The diffractive structure 506 is an embodiment of the diffractive structure discussed above with regard to FIG. 2. The diffractive structure 506 includes the LC grating 505, a polarization assembly 515, and a lens assembly 520. In alternate embodiments (not shown) the source assembly 500 includes some other number of sources and/or other components. For example, there may be one or more lenses between one or more of the source 510A, the source 510B, and the source 510C that condition (e.g., collimate, expand, etc.) the light prior to it being incident on the LC grating 505. Note that while a separation in z is shown between each of the components of the source assembly 500 in FIG. 5A, in other embodiments, the distances between components may be different and/or negligible. For example, in some embodiments, the sources are coupled directly to the LC grating 505, the LC grating 505 is coupled to the polarization assembly 515, the lens assembly 520 is directly coupled to the polarization assembly 515, or some combination thereof.

The plurality of sources emit light in accordance with instructions from a controller (e.g., the controller 280). The sources 510A, 510B, and 510C are embodiments of the sources discussed above with regard to FIG. 2, and are configured to emit unpolarized light. In the illustrated example, the sources 510A, 510B, and 510C are configured to emit light at substantially the same wavelength.

The plurality of sources is arranged such that light from each source may be used to generate a different interference pattern (e.g., has a phase offset such that it is different from the other interference patterns). Each of the plurality of sources have a positional offset from one another, such that each of the plurality of sources is located over a different respective range of x-y values and potentially z values. In the illustrated embodiment, the plurality of sources is arranged in a plane substantially parallel to the LC grating 505. In some embodiments, the plurality of sources is arranged such that a point of emission for each of the plurality of sources is on a line that is perpendicular to the z-axis. In the illustrated embodiment, the line is parallel to the x-axis and perpendicular to an optical axis 507 of the source assembly 500, but more generally it can be at any angle relative to the x-axis and the optical axis 507. Moreover, in some embodiments, a point of emission for at least one source has a substantially different z value than a point of emission for another source.

In the illustrated example, similar to the example discussed above with regard to FIGS. 3A and 3B, the plurality of sources is arranged such that there is a 120 degree phase offset between interference patterns produced using adjacent sources. In other embodiments, there may be more or less sources configured to have different offsets between their associated interference patterns.

The LC grating 505 diffracts light from a source (e.g., 510A, 510B, 510C) to generate a first right hand circularly polarized (RCP) beam and a left hand circularly polarized (LCP) beam that are diverging from each other. In some embodiments, the LC grating 505 is an active PBP liquid crystal grating or a passive PBP liquid crystal grating. Note in FIG. 5A, the RCP beam and the LCP beam are not shown, however, they are illustrated and discussed below with regard to FIG. 5B. As an incident beam passes through the LC grating 505, a LCP part of the beam becomes RCP and diffracts in one direction (+1$^{st}$ diffraction order), while a RCP part of the beam becomes LCP and diffracts in an another direction (−1$^{st}$ diffraction order). Moreover, the LC grating 505 may be designed such that a majority of the optical power is placed into a particular set of diffraction orders (e.g., ±1 diffraction orders).

The polarization assembly 515 converts the RCP beam and the LCP beam to a first linear polarized beam and a second linear polarized beam, respectively, that have a same polarization state such that they can be brought together to form an interference pattern (orthogonal polarizations do not interfere). In some embodiments, the polarization assembly 515 includes, e.g., a quarter-waveplate (QWP) and a half-waveplate (HWP) which can rotate an input state of polarization to an arbitrary output state of polarization. In this embodiment, the QP converts the RCP beam and the LCP beam to a first linear polarized beam and a second linear polarized beam, respectively, whose polarizations are orthogonal to each other. The HWP is used to rotate one of the linear polarized beams (but not the other) so that its polarization is aligned with the other. For example, the HWP may be positioned to rotate the polarization of the second linear polarized beam such that it is aligned with the polarization of the first linear polarized beam. In the case where the polarization assembly 515 is used to align the states of polarizations for each of the two linear polarized beams, the average power efficiency may be reduced.

In other embodiments, the polarization assembly 515 includes a first QWP in an optical path of the RCP beam and a second QWP in an optical path of the LCP beam. And the first QWP is aligned to a first angle and the second QWP is aligned to a second angle that is different from the first angle. The first angle and the second angle are determined such that light output by the first QWP and light output by the second QWP have a same linear polarization.

The lens assembly 520 is configured to direct the first polarized beam and the second polarized beam such that they overlap and interfere to form the interference pattern in the target area. In some embodiments, the lens assembly 520 is an array of microlenses. In other embodiments, the lens assembly 520 includes at least one optical element (e.g., lens, reflective mirror, etc.) for each of the first linear polarized beam and the second linear polarized beam that direct them such that they overlap to form an interference pattern in the target area 240. In other embodiments, the lens assembly 520 includes one freeform optical element that directs the first linear polarized beam and the second linear polarized beam such that they overlap to form an interference pattern in the target area 240.

Figure 5B:
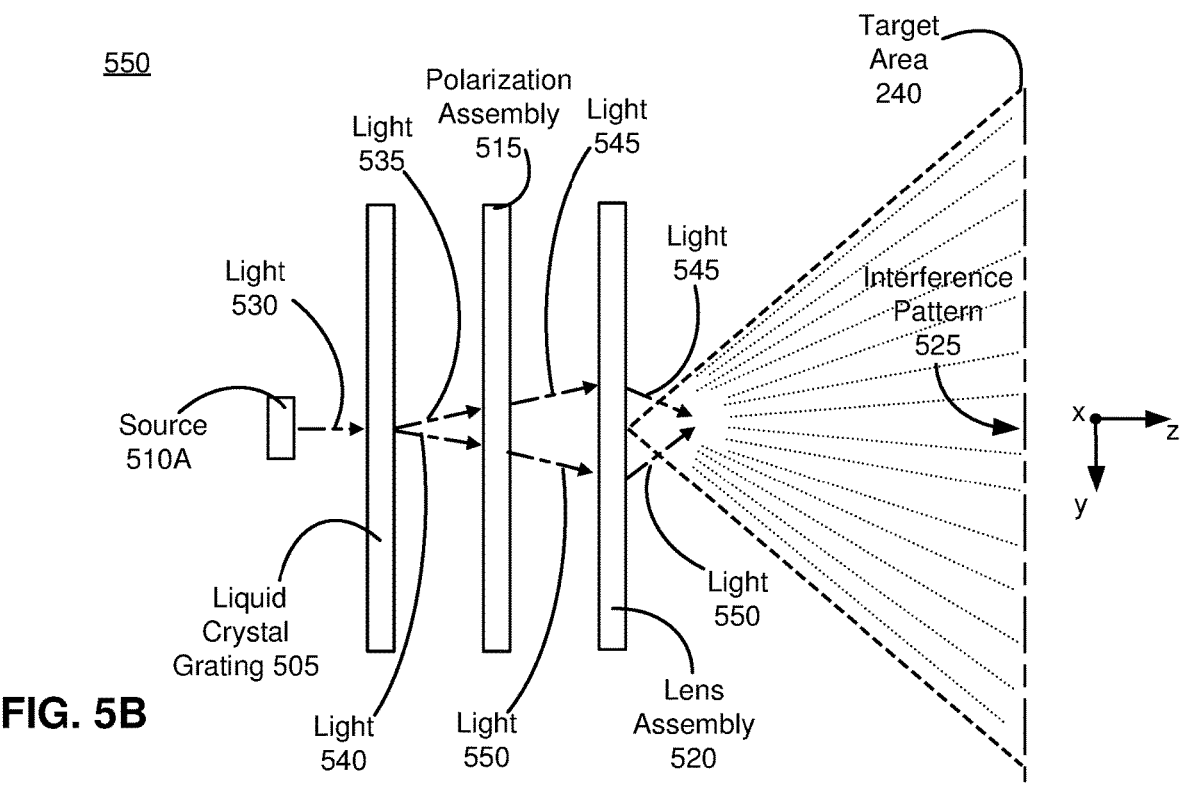
FIG. 5B is an example view of the source assembly of FIG. 5A creating an interference pattern, according to one or more embodiments.

FIG. 5B is an example view 550 of the source assembly 500 of FIG. 5A creating an interference pattern 525, according to one or more embodiments. FIG. 5B is a top down view of the source assembly 500 (v. FIG. 5A is a side view).

The source 510A emits light 530. The light 530 is unpolarized light. The LC grating 505 receives the light 530 and generates light 535 and light 540. Light 535 is circularly polarized with a first handedness (e.g., LCP) and the light 540 is circularly polarized with a second handedness that is orthogonal to the first handedness (e.g., RCP). The light 535 and the light 545 correspond to specific diffraction orders (e.g., +1 and −1, respectively), and are diverging from each other.

The polarization assembly 515 receives the light 535 and the light 540. The polarization assembly 515 adjusts polarization of the light 535 and the light 540 to form light 545 and light 550. The light 545 and the light 550 are linear polarized light and are polarized along a same axis (e.g., both vertically polarized).

The lens assembly 520 receives the light 545 and the light 550. The lens assembly 520 directs the light 545 and the light 550 such that they overlap and interfere to form the interference pattern 525 in the target area 240.

In some embodiments, the source assembly 500 may also include a phase shifting element at the output of the LC grating 505. The phase shifting element is a passive optical element that can add optical path difference (OPD) to one of the optical beams diffracted from the LC grating 505. For example, the phase shifting element may be a designed cube of glass or prism attached to an output side of one of the LC gratings 505. This may result in a phase delay for beams traveling through the phase shifting element.

The source assembly 500 can be produced in a manner that is very compact and efficient. Since optical elements used, such as the LC grating 505, are passive optical elements, the source assembly 500 has improved power efficiency over source assemblies that use, for example, acousto-optic modulators, electro-optic modulators, and/or photonic IC optical elements.

In some embodiments, wavelength multiplexing is used to produce multiple interference patterns 525 with phase offsets from each other at the target area 240. In this case, each source 510A, 510B, 510C of the source assembly may emit light of a substantially different band of wavelengths (e.g., a band of wavelengths corresponding to red, a band of wavelengths corresponding to blue, and a band of wavelengths corresponding to green). Since the diffractive structure 506 produces a different interference pattern 525 at the target area 240 for different wavelengths of light, the interference patterns corresponding to each source have a phase offset with respect to each other. As such, the sources 510A, 510B, 510C may have a negligible positional offset from each other and still produce interference patterns with a phase offset with respect to each other.

In alternate embodiments, the source assembly 500 includes a single source, and the single source includes a plurality of source components with each source component emitting light of a substantially different band of wavelengths (e.g., a band of wavelengths corresponding to red, a band of wavelengths corresponding to blue, and a band of wavelengths corresponding to green). Since the diffractive structure 506 produces a different interference pattern 525 at the target area 240 for different wavelengths of light, the interference patterns corresponding to each source component have a phase offset with respect to each other.

Additionally, for cases where the sources 510A, 510B, 510C have a substantial positional offset from each other, the different interference patterns may cover more area within the target area 240, and thereby allow for potentially faster determination of depth information. In some embodiments, a DCA 230 including the source assembly 500 also includes a camera assembly or sensors capable of detecting light of different wavelengths simultaneously.

For example, source 510A emits red light, source 510B emits blue light, and source 510C emits green light source. In this example, the LC gratings may be arranged such that the interference pattern 525 produced by light from the red light source 510A has a 120 degree phase offset from the interference pattern 525 produced by light from the blue light source 510B. The arrangement of LC gratings may be such that the interference pattern 525 produced by light from the green light source 510C has a 240 degree phase offset from the interference pattern 525 produced by the red light source 510A. In other embodiments there may be more or less LC gratings within the plurality of gratings, and they may be positioned to produce different offsets between their associated interference patterns. For example, the diffractive structure may include a plurality of LC gratings. The plurality of LC gratings may include a first LC grating and a second LC grating, with light from the source assembly passing in series through the first LC grating and the second LC grating to form a right circularly polarized (RCP) beam and a left hand circularly polarized (LCP) beam that are diverging from each other. In this case, the first LC grating is in a first position, and the second LC grating is in a second position that is offset from the first position in a direction orthogonal to an optical axis.

In some embodiments the source assembly 500 may include additional LC gratings and sources. Additional LC gratings and sources may enable the DCA 230 to cover a wider field of view. In embodiments where the diffractive structure 506 includes a plurality of LC gratings, the controller can instruct one or more of the plurality of LC to move relative to one other. For example, the controller may instruct a LC grating to translate and/or rotate in one or more directions. Thereby providing the controller an ability to dynamically generate interference patterns that have a continuous range of phase offsets.

Figure 6A:
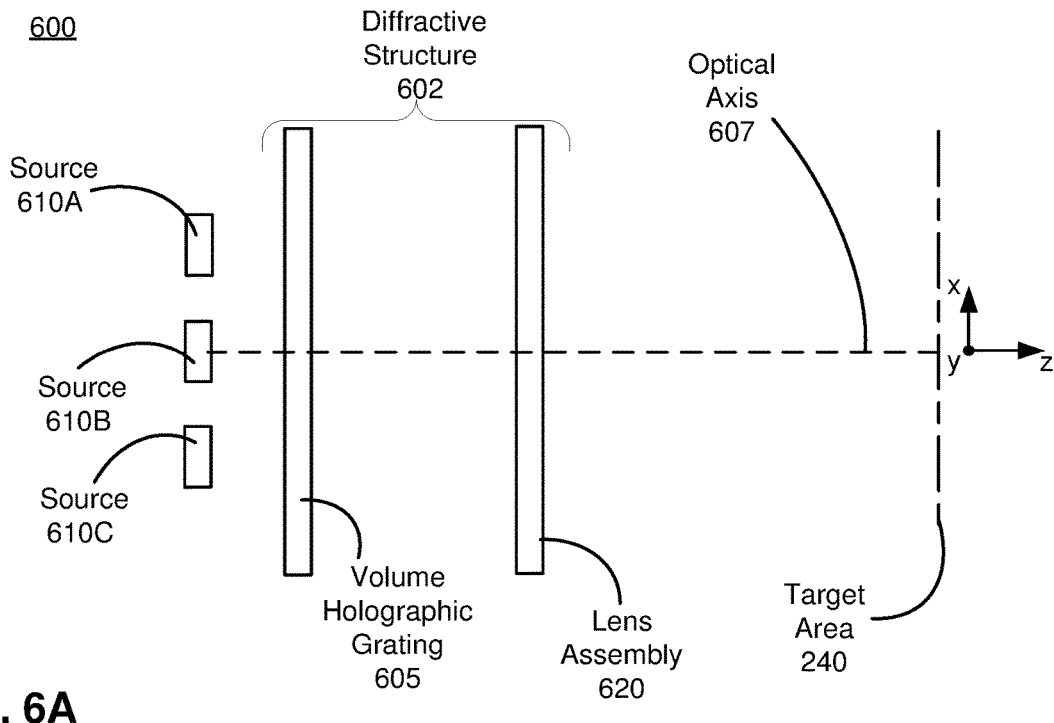
FIG. 6A is an example of source assembly that includes a volume holographic grating, according to one or more embodiments.

FIG. 6A is an example of source assembly 600 that includes a volume holographic grating 605, according to one or more embodiments. The source assembly 600 is an embodiment of the source assembly 260. The source assembly 600 includes a plurality of sources (e.g., source 610A, source 610B, source 610C) and a diffractive structure 602. The diffractive structure 602 is an embodiment of the diffractive structure discussed above with regard to FIG. 2. The diffractive structure includes, the volume holographic grating 605 and a lens assembly 620. In alternate embodiments (not shown) the source assembly 600 includes some other number of sources and/or other components. For example, there may be one or more lenses between one or more of the source 610A, the source 610B, and the source 610C that condition (e.g., collimate, expand, etc.) the light prior to it being incident on the volume holographic grating 605. Note that while a separation in z is shown between each of the components of the source assembly 600 in FIG. 6A, in other embodiments, the distances between components may be different and/or negligible. For example, in some embodiments, the sources are coupled directly to the volume holographic grating 605, and/or the volume holographic grating 605 is coupled to the lens assembly 620.

The plurality of sources emit light in accordance with instructions from a controller (e.g., the controller 280). The sources 610A, 610B, and 610C are embodiments of the sources discussed above with regard to FIG. 2. In the illustrated example, the sources 610A, 610B, and 610C are configured to emit light at substantially the same wavelength.

The plurality of sources is arranged such that light from each source may be used to generate a different interference pattern (e.g., has a phase offset such that it is different from the other interference patterns). Each of the plurality of sources have a positional offset from one another, such that each of the plurality of sources is located over a different respective range of x-y values and potentially z values. In the illustrated embodiment, the plurality of sources is arranged in a plane substantially parallel to the volume holographic grating 602 and perpendicular to an optical axis 607 of the source assembly 600. In some embodiments, the plurality of sources is arranged such that a point of emission for each of the plurality of sources is on a line that is perpendicular to the z-axis. In the illustrated embodiment, the line is parallel to the x-axis, but more generally it can be at any angle relative to the x-axis and the optical axis 607. Moreover, in some embodiments, a point of emission for at least one source has a substantially different z value than a point of emission for another source.

In the illustrated example, similar to the example discussed above with regard to FIGS. 3A and 3B, the plurality of sources is arranged such that there is a 120 degree phase offset between interference patterns produced using adjacent sources. And that in other embodiments there may be more or less sources configured to have different offsets between their associated interference patterns.

The volume holographic grating 605 is configured to receive light from the plurality of sources, and for each respective source of the plurality of sources the volume holographic grating 605 is configured to generate a respective first diffracted beam and a respective second diffracted beam that are diverging from each other. The first diffracted beam and the second diffracted beam correspond to corresponding set of diffraction orders (e.g., ±1, ±2, etc.). The volume holographic grating 605 includes a periodic phase or absorption perturbation throughout its entire volume. The volume holographic grating 605 may be fabricated from, e.g., lithium niobite ($LiNbO_3$), bismuth germanium oxygen (BGO), polymers, dichromated gelatin, photosensitive glasses, etc.

The volume holographic grating 605 may be designed such that a majority of the optical power is placed into a particular set of diffraction orders (e.g., ±1 diffraction orders). In some embodiments, the diffractive structure 602 may also include a beam block (not shown) that blocks a zeroth order component of the diffracted beam. Note in FIG. 6A, the first diffracted beam and the second diffracted beam are not shown, however, they are illustrated and discussed below with regard to FIG. 6B.

The lens assembly 620 is configured to direct the first diffracted beam and the second diffracted beam such that they overlap and interfere to form the interference pattern in the target area 240. In some embodiments, the lens assembly 620 is an array of microlenses. In other embodiments, the lens assembly 620 includes at least one optical element (e.g., lens, reflective mirror, etc.) for each of the first diffracted beam and the second diffracted beam such that direct them such that they overlap to form an interference pattern in the target area 240. In other embodiments, the lens assembly 620 includes one freeform optical element that directs the first diffracted beam and the second diffracted beam such that they overlap to form an interference pattern in the target area 240.

Note that in some embodiments (not shown) the source assembly 600 may include at least one source that emits at a wavelength that is substantially different than at least one other source (i.e., emit in different optical sub-bands) and/or light from at least one source has a substantially different polarization than light from at least one other source. In these embodiments, two sources of orthogonal polarizations (do not interfere with each other) and/or two sources of different optical sub bands may be active at the same time, allowing for a plurality of different interferences patterns to appear in the target area 240 during the same time period. The different interference patterns cover more area within the target area 240, and thereby allow for potentially faster determination of depth information.

The source assembly 600 can be produced in a manner that is very compact and efficient. Since the volume holographic grating 605 may be attached to the sources 610A, 610B, 610C directly, and the lens assembly 620 may also be attached directly to the volume holographic grating 605, the source assembly 600 may achieve a compact size. Additionally, the volume holographic grating 605 may not consume electrical power to diffract light, thus improving power efficiency of the source assembly 600 over those that use acousto-optic modulators.

Figure 6B:
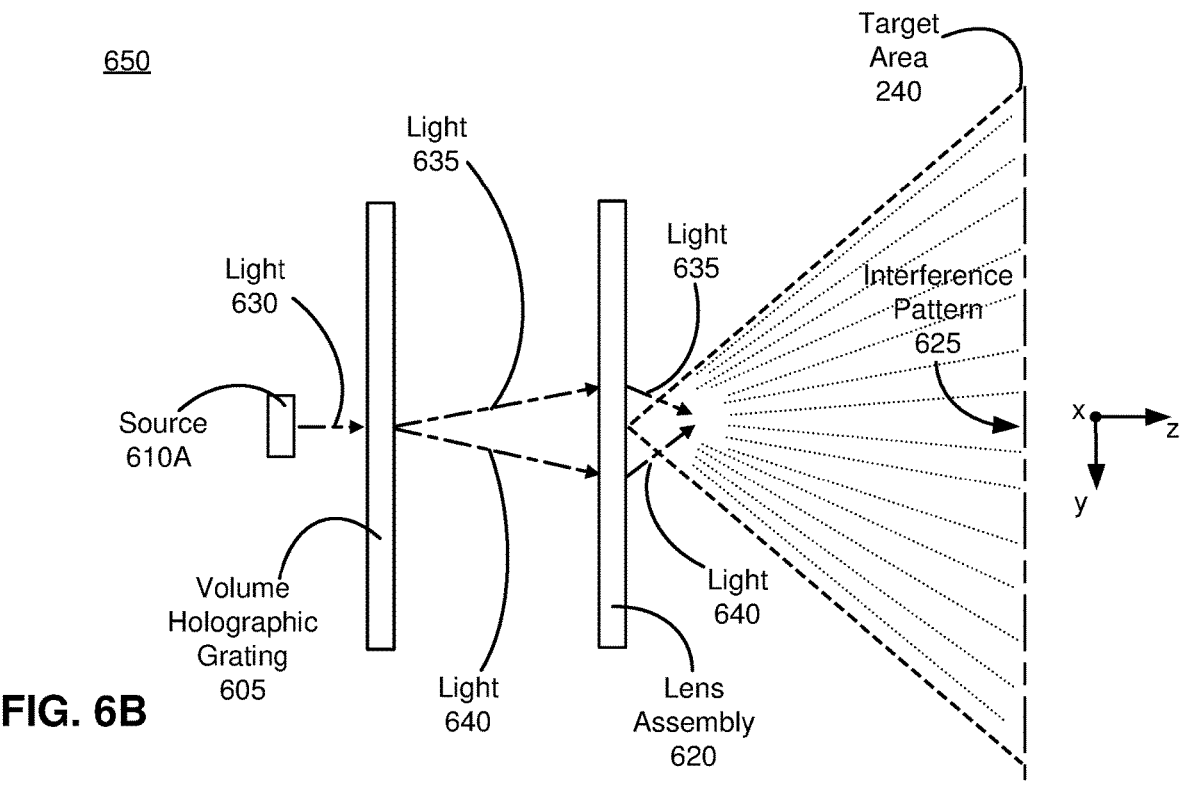
FIG. 6B is an example view of the source assembly of FIG. 6A creating an interference pattern, according to one or more embodiments.

FIG. 6B is an example view 650 of the source assembly 600 of FIG. 6A creating an interference pattern 625, according to one or more embodiments. FIG. 6B is a top down view of the source assembly 600 (v. FIG. 6A is a side view).

The source 610A emits light 630. The volume holographic grating 605 receives the light 630 and generates light 635 and light 640. The light 635 and the light 745 correspond to specific diffraction orders (e.g., +1 and −1, respectively), and are diverging from each other.

The lens assembly 620 receives the light 635 and the light 640. The lens assembly 620 directs the light 635 and the light 640 such that they overlap and interfere to form the interference pattern 625 in the target area 240.

Example of An Artificial Reality System

Figure 7:
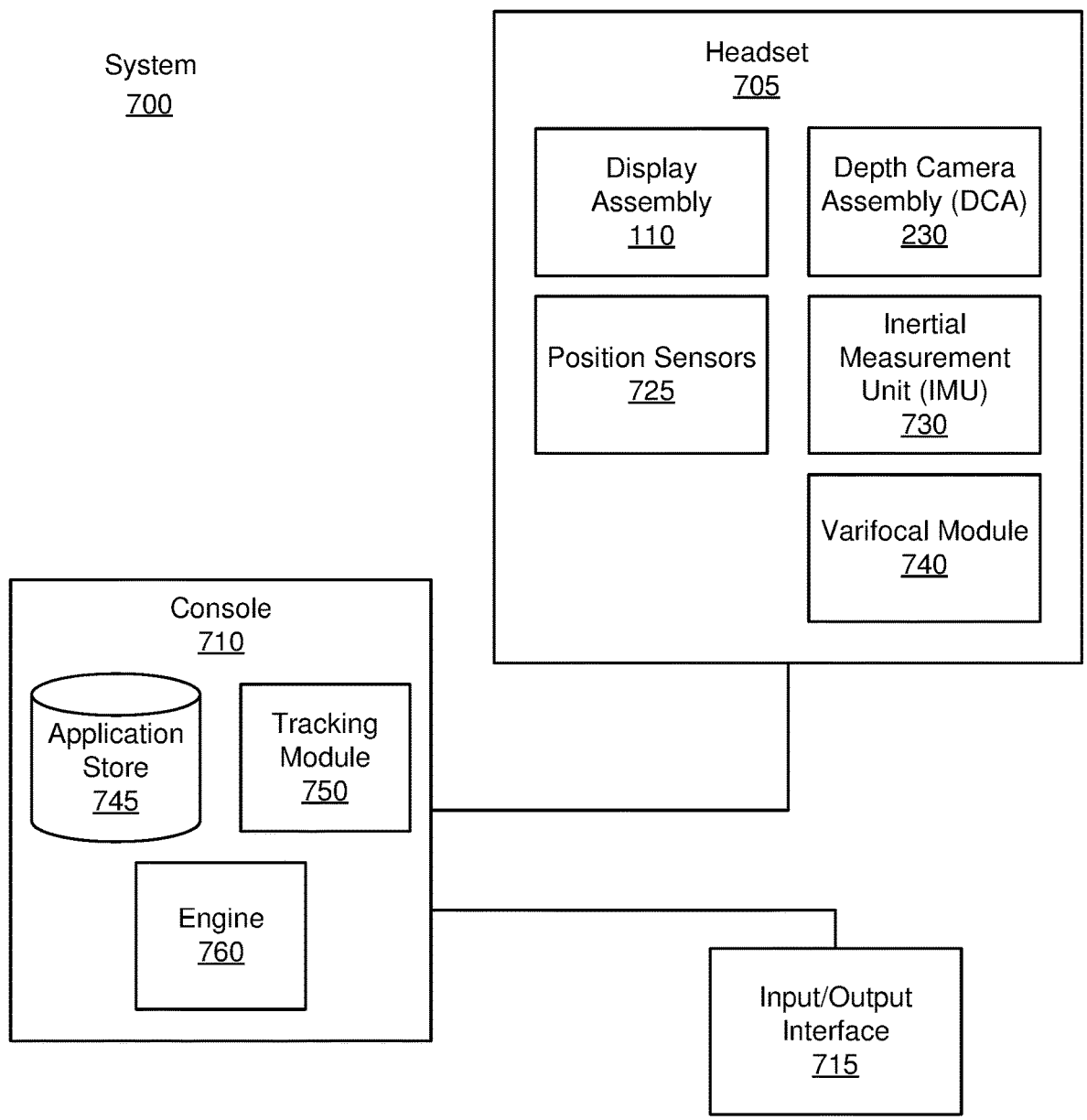
FIG. 7 is a block diagram of an example artificial reality system, according to one or more embodiments.

FIG. 7 is a block diagram of an artificial reality system 700, according to one or more embodiments. The system 700 may operate in e.g., a VR system environment, an AR system environment, a MR system environment, or some combination thereof. The system 700 shown by FIG. 7 comprises a headset 705, a console 710, and an input/output (I/O) interface 715. While FIG. 7 shows an example system 700 including one headset 705 and on I/O interface 715, in other embodiments any number of these components may be included in the system 700. For example, there may be multiple headsets 705 each having an associated I/O interface 715, with each headset 705 and I/O interface 715 communicating with the console 710. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 710 is provided by the headset 705.

The headset 705 may be a HMD or a NED that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the headset 705, the console 710, or both, and presents audio data based on the audio information. An embodiment of the headset 705 is the headset 100 described above in conjunction with FIG. 1A.

The headset 705 includes the DCA 230, the display assembly 110, one or more position sensors 725, an inertial measurement unit (IMU) 730, and an optional varifocal module 740. Some embodiments of the headset 705 have different components than those described in conjunction with FIG. 7. Additionally, the functionality provided by various components described in conjunction with FIG. 7 may be differently distributed among the components of the headset 705 in other embodiments.

The IMU 730 is an electronic device that generates data indicating a position of the headset 705 based on measurement signals received from one or more of the position sensors 725. A position sensor 725 generates one or more measurement signals in response to motion of the headset 705. Examples of position sensor 725 include: one or more accelerometers, one or more gyroscopes, one or more magnetometers, another suitable type of sensor that detects motion, a type of sensor used for error correction of the IMU 730, or some combination thereof. The position sensor 725 may be located external to the IMU 730, internal to the IMU 730, or some combination thereof.

Based on the one or more measurement signals from one or more position sensor 725, the IMU 730 generates data indicating an estimated current position of the headset 705 relative to an initial position of the headset 705. For example, the position sensors 725 include multiple accelerometers to measure translational motion (forward/back, up/down, left/right) and multiple gyroscopes to measure rotational motion (e.g., pitch, yaw, roll). In some embodiments, the IMU 730 rapidly samples the measurement signals and calculates the estimated current position of the headset 705 from the sampled data. For example, the IMU 730 integrates the measurement signals received from the accelerometers over time to estimate a velocity vector and integrates the velocity vector over time to determine an estimated current position of a reference point on the headset 705. Alternatively, the IMU 730 provides the sampled measurement signals to the console 710, which interprets the data to reduce error. The reference point is a point that may be used to describe the position of the headset 705. The reference point may generally be defined as a point in space or a position related to orientation and position of the headset 705.

The IMU 730 receives one or more parameters from the console 710. The one or more parameters are used to maintain tracking of the headset 705. Based on a received parameter, the IMU 730 may adjust one or more IMU parameters (e.g., sample rate). In some embodiments, certain parameters cause the IMU 730 to update an initial position of the reference point so it corresponds to a next position of the reference point. Updating the initial position of the reference point as the next calibrated position of the reference point helps reduce accumulated error associated with the current position estimated the IMU 730. The accumulated error, also referred to as drift error, causes the estimated position of the reference point to "drift" away from the actual position of the reference point over time. In some embodiments of the headset 705, the IMU 730 may be a dedicated hardware component. In other embodiments, the IMU 730 may be a software component implemented in one or more processors.

As described above with regard to FIGS. 2-6B, the DCA 230 determines tracking information for the eyes and/or face within a target area (e.g., the target are 240), according to some embodiments. A source assembly of the DCA 230 illuminates the target area with an interference pattern. A camera assembly of the DCA 230 captures images of the target area illuminated with the interference pattern, and a controller of the DCA 230 determines depth information for the eye and/or portions of the face within the target area. The controller determines tracking information using the determined depth information. The DCA 230 can compute the depth information using the data, and/or the DCA 230 can send this information to another device such as the console 710 that can determine the depth information and/or tracking information using data from the DCA 230.

In some embodiments, the varifocal module 740 is integrated with the headset 705. The varifocal module 740 may be coupled to the DCA 230 of the display assembly 620 to obtain tracking information. The varifocal module 740 may be configured to adjust a location of an image plane by adjusting a location of one or more elements (e.g., the display, the illumination assembly, some other optical element) within the display assembly 110 and/or adjusting an optical power of one or more elements within the display assembly.

The varifocal module 740 may be also configured to adjust resolution of the image light emitted by the display by instructing the display to perform foveated rendering of the image light, based at least in part on the determined depth information. The varifocal module 740 instructs the display to emit images with a maximum pixel density in a foveal region of the user's eye-gaze, and emit images with lower pixel densities in other regions.

The I/O interface 715 is a device that allows a user to send action requests and receive responses from the console 710. An action request is a request to perform a particular action. For example, an action request may be an instruction to start or end capture of image or video data or an instruction to perform a particular action within an application. The I/O interface 715 may include one or more input devices. Example input devices include: a keyboard, a mouse, a game controller, or any other suitable device for receiving action requests and communicating the action requests to the console 710. An action request received by the I/O interface 715 is communicated to the console 710, which performs an action corresponding to the action request. In some embodiments, the I/O interface 715 includes an IMU 730 that captures calibration data indicating an estimated position of the I/O interface 715 relative to an initial position of the I/O interface 715. In some embodiments, the I/O interface 715 may provide haptic feedback to the user in accordance with instructions received from the console 710. For example, haptic feedback is provided when an action request is received, or the console 710 communicates instructions to the I/O interface 715 causing the I/O interface 715 to generate haptic feedback when the console 710 performs an action.

The console 710 provides content to the headset 705 for processing in accordance with information received from one or more of: the DCA 230, the headset 705, and the I/O interface 715. In the example shown in FIG. 7, the console 710 includes an application store 745, a tracking module 750, and an engine 760. Some embodiments of the console 710 have different modules or components than those described in conjunction with FIG. 7. Similarly, the functions further described below may be distributed among components of the console 710 in a different manner than described in conjunction with FIG. 7.

The application store 745 stores one or more applications for execution by the console 710. An application is a group of instructions, that when executed by a processor, generates content for presentation to the user. Content generated by an application may be in response to inputs received from the user via movement of the headset 705 or the I/O interface 715. Examples of applications include: gaming applications, conferencing applications, video playback applications, or other suitable applications.

The tracking module 750 calibrates the system 700 using one or more calibration parameters and may adjust one or more calibration parameters to reduce error in determination of the position of the headset 705 or of the I/O interface 715. Calibration performed by the tracking module 750 also accounts for information received from the IMU 730 in the headset 705 and/or an IMU 730 included in the I/O interface 715. Additionally, if tracking of the headset 705 is lost, the tracking module 750 may re-calibrate some or all of the NED system 600.

The tracking module 750 tracks movements of the headset 705 or of the I/O interface 715 using information from one or more external cameras configured to image the headset 705, a DCA on the headset 705 that is configured to provide depth information for a region surrounding the headset 705 (referred to as an outward facing DCA), the one or more position sensor 630, the IMU 730 or some combination thereof. For example, the tracking module 750 determines a position of a reference point of the headset 705 in a mapping of a region surrounding the headset 705 based on information from the headset 705. The tracking module 750 may also determine positions of the reference point of the headset 705 or a reference point of the I/O interface 715 using data indicating a position of the headset 705 from the IMU 730 or using data indicating a position of the I/O interface 715 from an IMU 730 included in the I/O interface 715, respectively. Additionally, in some embodiments, the tracking module 750 may use portions of data indicating a position or the headset 705 from the IMU 730 as well as representations of the local area from the DCA 230 to predict a future location of the headset 705. The tracking module 750 provides the estimated or predicted future position of the headset 705 and/or the I/O interface 715 to the engine 760.

In some embodiments, the engine 760 generates a three-dimensional mapping of the area surrounding the headset 705 (i.e., the "local area") based on information received from the headset 705. In some embodiments, the engine 760 determines depth information for the three-dimensional mapping of the local area based on information received from an outward facing DCA that is relevant for techniques used in computing depth. The engine 760 may calculate depth information using one or more techniques in computing depth from the portion of the reflected light detected by the outward facing DCA, such as stereo based techniques, the structured light illumination technique, and the time-of-flight technique. In various embodiments, the engine 760 uses the depth information to, e.g., update a model of the local area, and generate content based in part on the updated model.

The engine 760 also executes applications within the system 600 and receives position information, acceleration information, velocity information, predicted future positions, or some combination thereof, of the headset 705 from the tracking module 750. Based on the received information, the engine 760 determines content to provide to the headset 705 for presentation to the user. For example, if the received information indicates that the user has looked to the left, the engine 760 generates content for the headset 705 that mirrors the user's movement in a virtual environment or in an environment augmenting the local area with additional content. Additionally, the engine 760 performs an action within an application executing on the console 710 in response to an action request received from the I/O interface 715 and provides feedback to the user that the action was performed. The provided feedback may be visual or audible feedback via the headset 705 or haptic feedback via the I/O interface 715.

In some embodiments, the engine 760 can be configured to utilize, in association with the console 710 and the headset 705, the tracking information obtained from the eye tracking system for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the eye tracking system, the engine 760 determines resolution of the content provided to the headset 705 for presentation by the display of the display assembly 110. The engine 760 provides the content to the headset 705 having a maximum pixel density (maximum resolution) on the display in a foveal region of the user's gaze, whereas the engine 760 provides a lower pixel resolution in other regions of the display, thus achieving less power consumption at the headset 705 and saving computing cycles of the console 710 without compromising a visual experience of the user. In some embodiments, the engine 760 can be configured to optimize the performance of other components of the headset 705 based on the tracking information obtained from the eye tracking system. In one embodiment, the engine 760 can instruct the varifocal module 740 to adjust a location of an image plane, e.g., to prevent vergence-accommodation conflict.

In some embodiments the engine 760 collects calibration attributes from the images of the DCA 230 and/or the tracking information. The calibration attributes describe landmarks (e.g., a location of an eyebrow or nose of the user) of the face that surround the eyes and are covered by the headset 705. In some embodiments, the engine 760 uses the tracked portions of the face (may also include eye position) and the calibration attributes to generate facial animation information describing the tracked portions of the user's face. The facial animation information can then be used to, e.g., render an avatar of a user where the facial expressions of the avatar match that of the user for at least the tracked area of the user's face.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
a plurality of sources that are located at different positions within a plane that is bisected by an optical axis of the DCA;
a diffractive structure configured to generate an interference pattern that is projected into a target area within a threshold distance from the DCA, the diffractive structure generating the interference pattern using light from at least one of the plurality of sources, wherein a phase of the interference pattern is based in part on positions of one or more sources of the plurality of sources whose light is used to generate the interference pattern;
a camera assembly configured to capture images of a portion of the target area that includes the interference pattern; and
a controller configured to determine depth information for the portion of the target area using the captured images.

2. The DCA of claim 1, wherein the diffractive structure comprises:
a diffractive optical element (DOE) that diffracts an input light beam into a plurality of first order diffracted output light beams including a pair of output light beams, and has a DOE phase profile wherein respective light from the plurality of sources in the target area, that has been transmitted by the DOE, is a Fourier transform of a spatial profile of the light multiplied by the DOE phase profile.

3. The DCA of claim 1, wherein the diffractive structure comprises:
a liquid crystal grating configured to receive light from the plurality of sources, and for each respective source of the plurality of sources generates at least a first right hand circularly polarized (RCP) beam and a left hand circularly polarized (LCP) beam that are diverging from each other;
a polarization assembly that converts the RCP beam and the LCP beam to a first linear polarized beam and a second linear polarized beam, respectively, wherein the first linear polarized beam and the second linear polarized beam have a same polarization state; and
a lens assembly configured to direct the first linear polarized beam and the second linear polarized beam such that they overlap and interfere to form the interference pattern in the target area.

4. The DCA of claim 3, wherein the polarization assembly comprises:

a first quarter waveplate at a first orientation that converts the RCP beam to the first linear polarized beam; and
a second quarter waveplate at a second orientation that converts the LCP beam to the second linear polarized beam.

5. The DCA of claim 3, wherein the polarization assembly comprises:
a quarter waveplate at that converts the RCP beam to the first linear polarized beam and the LCP beam to the second linear polarized beam with a polarization state that is orthogonal to the first linear polarized beam; and
a half waveplate that rotates the first linear polarized beam to align with the polarization state of the second linear polarized beam.

6. The DCA of claim 3, wherein,
each of the plurality of sources emits light of a different band of wavelengths,
the diffractive structure is configured to generate a different interference pattern for each source of the plurality sources, and
the camera assembly is configured to detect different wavelengths of light reflected from the target area simultaneously.

7. The DCA of claim 1, wherein the plurality of sources emit light at a same wavelength and are assigned to groups that can have two potential states, including an active state where all of one or more sources in a group emit light, and an inactive state where none of the one or more sources in the group emit light,
wherein for a given time period only one group is in the active state, and any remaining groups are in the inactive state.

8. The DCA of claim 1, wherein the plurality of sources is assigned to groups that can have two potential states, including an active state where all of one or more sources in a group emit light, and an inactive state where none of the one or more sources in the group emit light, wherein
for a given time period, a first group and a second group are in the active state, and any remaining groups are in the inactive state, and sources in the first group emit light in a different optical band than light emitted by sources in the second group.

9. The DCA of claim 1, wherein the plurality of sources is assigned to groups that can have two potential states, including an active state where all of one or more sources in a group emit light, and an inactive state where none of the one or more sources in the group emit light,
wherein for a given time period a first group and a second group are in the active state, and any remaining groups are in the inactive state, and sources in the first group emit light that has a different polarization than light emitted from sources in the second group.

10. The DCA of claim 1, wherein the diffractive structure comprises:
a volume holographic grating configured to receive light from the plurality of sources, and for each respective source of the plurality of sources the volume holographic grating generates a respective first diffracted beam and a respective second diffracted beam that are diverging from each other; and
a lens assembly configured to direct the first diffracted beam and the second diffracted beam such that they overlap and interfere to form the interference pattern in the target area.

11. The DCA of claim 1, wherein tracking information of the portion of the target area is determined based on the depth information.

12. The DCA of claim 11, wherein the target area includes an eyebox, and the portion of the target area includes a portion of a face surrounding eyes of a user, and the tracking information includes eye tracking information and facial tracking information that describes movement of the portion of the face.

13. The DCA of claim 11, wherein an object of the target area comprises a hand of a user, and the tracking information includes hand tracking information that describes movement of the hand.

14. The DCA of claim 1, wherein the DCA is part of a headset, the target area is within a local area surrounding the DCA, and the DCA is oriented such that the target area does not include a face of a user wearing the headset.

15. A wearable device comprising:
an electronic display configured to emit image light; and
a depth camera assembly (DCA) comprising:
a source assembly including at least one source within a plane that is bisected by an optical axis of the DCA,
a diffractive structure configured to generate an interference pattern that is projected into a target area within a threshold distance from the DCA, the diffractive structure generating the interference pattern using light from the source assembly,
a camera assembly configured to capture images of a portion of the target area that includes the interference pattern, and
a controller configured to determine depth information for the portion of the target area using the captured images,
wherein the image light is based in part on the depth information.

16. The wearable device of claim 15, wherein the diffractive structure comprises:
a plurality of LC gratings comprising a first LC grating and a second LC grating, and light from the source assembly passes in series through the first LC grating and the second LC grating to form a right circularly polarized (RCP) beam and a left hand circular polarized (LCP) beam that are diverging from each other, wherein,
the first LC grating is in a first position,
the second LC grating is in a second position that is offset from the first position in a direction orthogonal to an optical axis; and
a polarization assembly that converts the RCP beam and the LCP beam to a first linear polarized beam and a second linear polarized beam, respectively, wherein the first linear polarized beam and the second linear polarized beam have a same polarization state; and
a lens assembly configured to direct the first linear polarized beam and the second linear polarized beam such that they overlap and interfere to form the interference pattern in the target area.

17. The wearable device of claim 15, wherein,
the at least one source includes a plurality of source components, each source component emitting light of a different band of wavelengths,
the diffractive structure is configured to generate a different interference pattern for each source component of the plurality of source components, and
the camera assembly is configured to detect different wavelengths of light reflected from the target area simultaneously.

18. The wearable device of claim 16, wherein the polarization assembly comprises:

a first quarter waveplate at a first orientation that converts the RCP beam to the first linear polarized beam; and a second quarter waveplate at a second orientation that converts the LCP beam to the second linear polarized beam.

19. The wearable device of claim 16, wherein the polarization assembly comprises:

a quarter waveplate at that converts the RCP beam to the first linear polarized beam and the LCP beam to the second linear polarized beam with a polarization state that is orthogonal to the first linear polarized beam; and a half waveplate that rotates the first linear polarized beam to align with the polarization state of the second linear polarized beam.

20. The wearable device of claim 15, wherein the source assembly comprises a plurality of sources that are located at different positions within the plane that is bisected by the optical axis of the DCA, and the diffractive structure comprises:

a diffractive optical element (DOE) that diffracts an input light beam into a plurality of first order diffracted output light beams including a pair of output light beams and has a DOE phase profile, wherein respective light from the plurality of sources in the target area, that has been transmitted by the DOE, is a Fourier transform of a spatial profile of the light multiplied by the DOE phase profile.

21. The wearable device of claim 15, wherein the source assembly comprises a plurality of sources that are located at different positions within the plane that is bisected by the optical axis of the DCA, and the diffractive structure comprises:

a liquid crystal grating configured to receive light from the plurality of sources, and for each respective source of the plurality of sources generates at least a first right hand circularly polarized (RCP) beam and a left hand circularly polarized (LCP) beam that are diverging from each other;

a polarization assembly that converts the RCP beam and the LCP beam to a first linear polarized beam and a second linear polarized beam, respectively, wherein the first polarized beam and the second polarized beam have a same polarization state; and a lens assembly configured to direct the first polarized beam and the second polarized beam such that they overlap and interfere to form the interference pattern in the target area.

22. The wearable device of claim 15, wherein the source assembly comprises a plurality of sources that are located at different positions within the plane that is bisected by the optical axis of the DCA, and the diffractive structure comprises:

a volume holographic grating configured to receive light from the plurality of sources, and for each respective source of the plurality of sources the volume holographic grating generates a respective first diffracted beam and a respective second diffracted beam that are diverging from each other; and a lens assembly configured to direct the first diffracted beam and the second diffracted beam such that they overlap and interfere to form the interference pattern in the target area.

* * * * *